Inventor
James W. Hand
By
W. E. Currie, Attorney

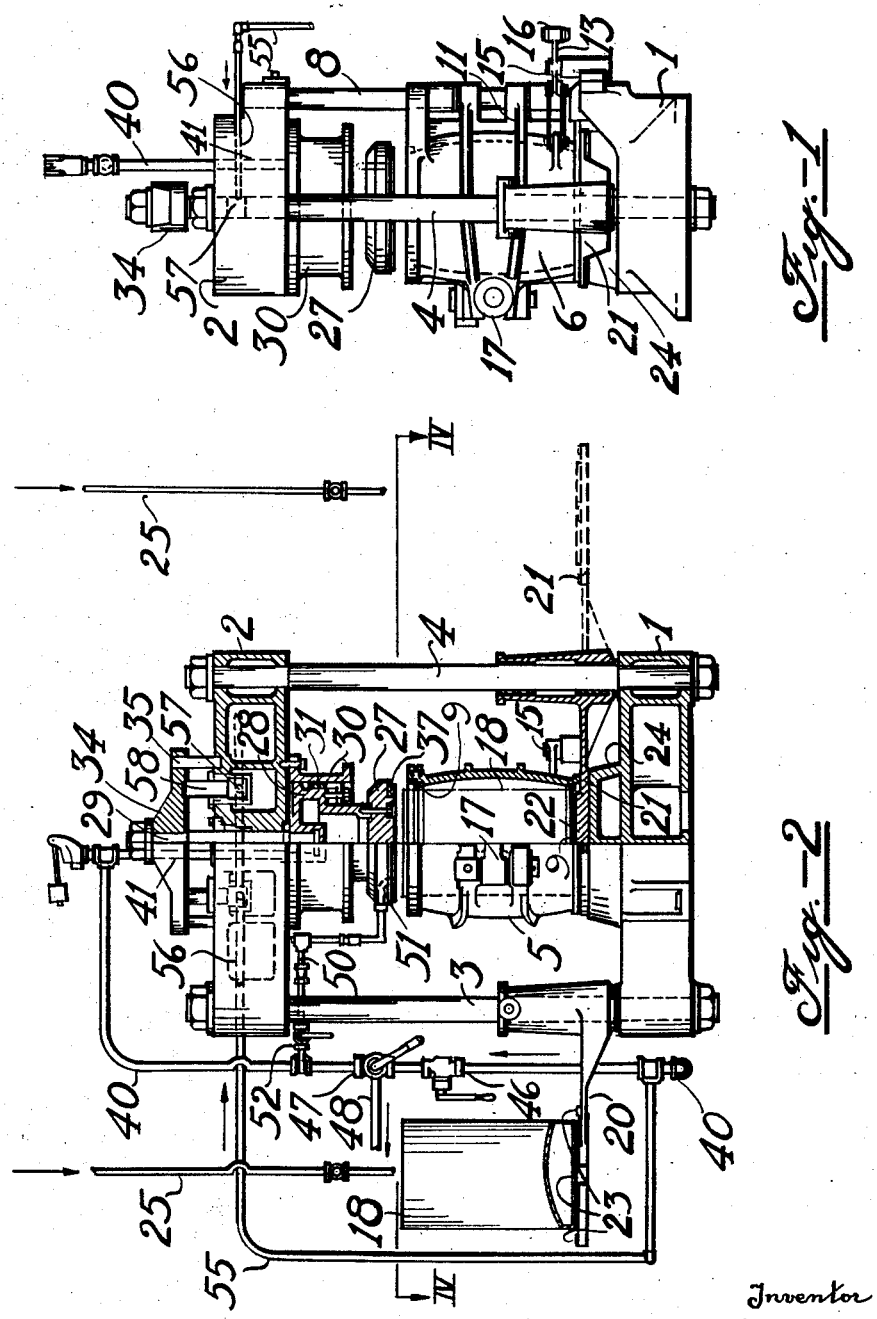

Patented Sept. 11, 1934

1,973,622

UNITED STATES PATENT OFFICE 1,973,622

APPARATUS FOR SHAPING RECEPTACLES

James W. Hand, Elizabeth, N. J., assignor to Standard Oil Development Company, a corporation of Delaware Application December 29, 1931, Serial No. 583,641

3 Claims. (Cl. 113—44)

This invention relates to improvements in apparatus for shaping hollow articles by fluid pressure.

It is an object of this invention to utilize an inextensible mold shell of full barrel shape in an apparatus for shaping a drum into barrel shape. Another object is to provide improved means for filling the drum with liquid and for inserting the drum into the mold shell. Still another object is to provide a mold shell having a replaceable lining at the portions receiving greatest wear.

Other objects will be apparent from the specification and from the accompanying drawings in which latter—

Fig. 1 is a side elevational view of the device showing the sectional mold shell in closed position.

Fig. 2 is a front elevational view of the device partly in vertical section showing a cylindrical drum in position to be filled with liquid and showing a filled cylindrical drum in position to be expanded into barrel shape.

Figure 3:
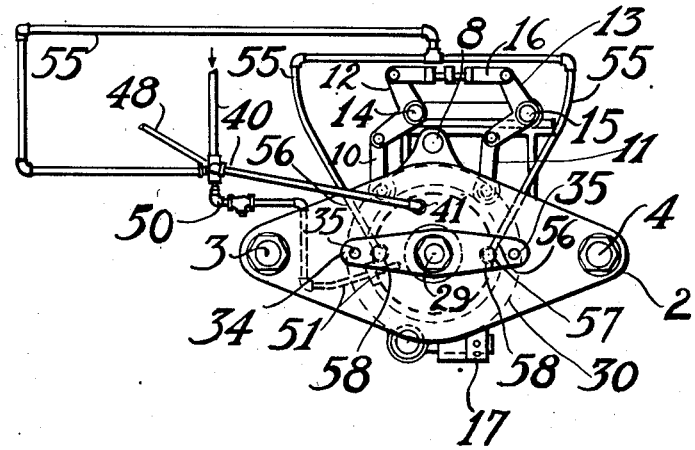
Fig. 3 is a top plan view of the device with one of the brackets removed.

Referring particularly to the drawings, reference numeral 1 designates a bed or base. A cross-head 2 is supported above the base by suitable pillars 3 and 4. A mold shell for the sidewalls of the drum to be shaped is formed of sections 5 and 6 which are pivotally carried by means of a vertical post 8. The post is supported by the base 1 and cross-head 2. The shell sections 5 and 6 cooperate to form when closed a cavity of barrel shape. The ends of the shell sections are provided with replaceable linings 9.

The shell sections are so formed that the manipulation of one of the sections to open or close it correspondingly opens or closes the other section through the following arrangement of parts. Links 10 and 11 are pivotally connected to the shell sections 5 and 6 respectively. The links 10 and 11 are also pivotally connected to an arm of bell cranks 12 and 13 respectively. The bell cranks are pivotally supported upon the base plate 1 by pins 14 and 15 respectively. An adjustable link 16 is connected to the other arm of each bell crank. The mold sections are secured in closed position by suitable latching means 17. In the embodiment illustrated the mold is adapted to receive a cylindrical drum 18.

Figure 4:
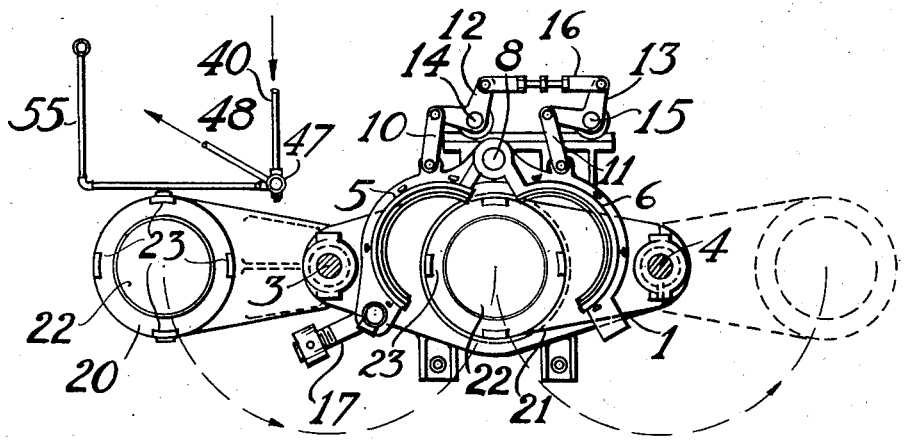
Fig. 4 is a transverse sectional view taken along the line IV—IV of Fig. 2 and showing the mold sections in open position and the drum removed.

The cylinderical drum is supported by one of two brackets or cranes 20 and 21. The brackets are pivotally supported by means of the pillars 3 and 4 respectively so as to be swung from a position laterally of the mold as shown by bracket 20 in Fig. 2, into a position to form a bottom for the mold as shown in full lines by bracket 21 in Figs. 2 and 4. Each bracket is provided with a raised circular central portion 22 and with a plurality of ribs 23 spaced from the periphery of the raised portion, thereby forming recesses in the bracket adapted to receive snugly the chime at the base of the metal drum 18 and prevent lateral expansion of the base of the drum. An abutment 24 on the base 1 forms a backing for the bracket.

A valved line 25 is provided for filling the cylindrical drum with liquid such as water while supported in the position shown by bracket 20 in Fig. 2. One drum is filled with liquid while another drum is being shaped within the mold. After filling the drum with liquid it is positioned within the open mold shell sections by swinging the bracket around its supporting post. The mold sections are then closed into the position illustrated in Fig. 1 whereby the sides and bottom of the cylindrical drum are encased with an unyielding form, the side walls of which are belled outwardly in barrel shape. The open end of the drum protrudes beyond the open end of the mold sections.

Means are provided for pressing against the protruding end of the cylindrical drum to compress the drum upon the supporting bracket for the drum. This means comprises a ram including a head 27 carried by a piston. The piston includes a piston head 28 and piston rod 29 reciprocable within a guideway attached to the cross-head 2. The piston is reciprocable in a cylinder 30 carried by the cross-head by means of fluid supplied under pressure to the cylinder in a manner to be later described. Suitable packing 31 maintains a fluid tight joint between the piston and cylinder. The piston rod extends through the cross-head into engagement with a cross-bar 34. The cross-bar 34 is guided in its reciprocating movement with the piston by means of pins 35 which project upwardly rigidly from the cross-head 2. The head 27 of the ram is provided with an annularly recessed die ring 37 for engaging the protruding end of the cylindrical drum.

The ram is actuated by water or other suitable fluid which is injected from a pressure pump, not shown, through a line 40 and through a passage 41 in the cross-head 2 against the piston head 28. The line 40 is provided with a valve 46 for opening or closing the connection of the line with the pressure pump. A two-way valve 47 is provided in line 40 between the valve 46 and the passage 41 communicating with the exhaust line 48 whereby the fluid under pressure can either be directed through the passage 41 against the head of the ram or can be discharged through the exhaust line 48. A line 50 leads from the line 40 between the valve 47 and the passage 41 and opens into a passageway 51 in the ram head 27. The passageway 51 in turn opens through the bottom face of the ram head in position to communicate with the interior of the drum. A valve 52 is provided in the line 50. The fluid is maintained under a pressure sufficient to expand the cylindrical drum to the desired shape; such pressure may be seven or seven hundred fifty pounds per square inch or the like.

The ram is withdrawn from engagement with the cylindrical drum by the following arrangement of parts. A line 55 leads from the line 40 between the compressor pump, not shown, and the valve 46 and communicates through a passageway 56 with cylinders 57 in the crosshead. The fluid contained in the line exerts a continuous upward pressure upon pistons 58 in the cylinders 57 and when the fluid pressure through passage 41 against the head of the ram is released functions to elevate the ram to the position illustrated in Fig. 2.

In the operation of the device the cylindrical drum is positioned upon one of the supporting brackets 20 or 21 where it is filled with liquid such as water. The shell sections are opened. The bracket with its supported drum is swung horizontally until the drum is positioned between the shell sections. The shell sections are now closed and locked in closed position. The valves 46 and 47 are opened to permit flow of the compressed fluid such as water through passage 41 to drive the ram downwardly. The ram head engages the protruding end of the cylindrical drum sealing the connection between the ram head and the drum. The operator manipulates the valve 52 thereby permitting flow of compressed liquid into the interior of the cylindrical drum, placing the contents of the drum under pressure. The metal of the sidewalls of the drum expands to fill the mold. This expansion is facilitated by the downward movement of the ram into contact with the top of the shell sections which forces the protruding end of the drum into the mold sufficiently to prevent thinning of the metal of the drum. The valve 52 is then closed cutting off the supply of liquid under pressure to the interior of the drum. Valve 47 is manipulated to cut off the supply of fluid under pressure against the head of the ram. The pressure of the fluid in the line 55 acting upon the pistons 58 withdraws the ram to its elevated position.

The mold sections are opened and the bracket with the shaped drum is swung around to the position shown in dotted lines in Fig. 2. The shaped drum is then tilted into position to discharge the liquid into a suitable drain, not shown. The shaped drum is removed from the bracket and is replaced by an unshaped drum which is filled with liquid from pipe 25 while the drum on the other bracket is being shaped. One drum is thus being prepared for shaping while the other drum is being bilged into shape.

While the invention has been described as applied to the shaping of a metal cylindrical drum having an open end to a barrel shape, it will be understood that it can be applied to the shaping of other articles to other shapes. The device is applicable to the reshaping of metal barrels which have become dented or misshapen in use. A cylindrical drum having a closed head with an opening which will communicate with the passageway 51 to permit access of pressure fluid to the interior of the drum can be shaped.

Various changes may be made within the scope of the appended claims in which it is desired to claim all novelty inherent in the invention as broadly as the prior art permits.

I claim:

1. A machine for shaping a hollow drum comprising a support, a sectional mold shell the sections of which are pivotally carried by the support for lateral movement, links connecting the sections whereby pivotal movement of one section effects corresponding pivotal movement of the other section, a bottom support for one end of the drum, a movable head adapted to engage and close the other end of the drum, and means for applying fluid pressure to the interior of the drum.

2. In a machine for shaping a hollow drum, a support, a sectional mold shell the sections of which are pivotally carried by the support for lateral movement, and means including a bell crank pivotally connected to each mold section and a link connecting the bell cranks whereby pivotal movement of one section effects corresponding pivotal movement of the other section.

3. A machine for shaping a hollow drum, comprising a mold shell adapted to receive the drum, a ram for closing the end of the drum and including a piston, a support reciprocably receiving the piston, a cross-bar secured to the piston, cylinders carried by the support, pistons carried by the cross-bar and reciprocable in the cylinders, a valved line for introducing fluid under pressure against the outer side of the ram piston to force the ram against the drum, and a line for continuously introducing fluid under pressure against the cross-bar pistons whereby the ram is moved away from the drum when the first mentioned fluid line is cut off.

JAMES W. HAND.